United States Patent
Yoshida et al.

[11] Patent Number: 5,197,451
[45] Date of Patent: Mar. 30, 1993

[54] METHOD FOR DETECTING FUEL BLENDING RATIO

[75] Inventors: Masato Yoshida, Kyoto; Takanao Yokoyama, Nagaokakyo; Muneyoshi Nanba, Kyoto; Yoshihiko Kato, Kyoto; Kazumasa Iida, Kyoto; Katsuhiko Miyamoto, Kyoto, all of Japan

[73] Assignee: Mitsubishi Jidosha Kogyo Kabushiki Kaisha, Tokyo, Japan

[21] Appl. No.: 752,449
[22] PCT Filed: Jan. 16, 1991
[86] PCT No.: PCT/JP91/00034
§ 371 Date: Sep. 26, 1991
§ 102(e) Date: Sep. 26, 1991
[87] PCT Pub. No.: WO91/10824
PCT Pub. Date: Jul. 25, 1991

[30] Foreign Application Priority Data

Jan. 19, 1990 [JP] Japan .................. 2-11517

[51] Int. Cl.$^5$ .............. F02D 45/00; F02D 19/08; F02D 41/14
[52] U.S. Cl. ...................... 123/696; 123/494
[58] Field of Search .............. 123/14, 440, 489, 494, 123/686

[56] References Cited

U.S. PATENT DOCUMENTS 4,706,629 11/1987 Wineland et al. ............ 123/478
5,094,208 3/1992 Adam et al. ............ 123/489 X

FOREIGN PATENT DOCUMENTS 191641 8/1987 Japan .
195439 8/1987 Japan .
5131 1/1988 Japan .

Primary Examiner—Tony M. Argenbright

[57] ABSTRACT

A fuel blending ratio detecting method is provided which includes a feedback computing compensation coefficient $K_{FB}$ on the basis of an air/fuel ratio responsive output $V_o$ of an $O_2$ sensor, computing a feedback learned value $K_{LRN}$ on the basis of the feedback compensation coefficient $K_{FB}$ at intervals of a predetermined period, and multiplying the current blending ratio compensation coefficient $K_B$ by this feedback learned value $K_{LRN}$ to compute the next blending ratio compensation coefficient $K_B$. Thus, the quantity of fuel supplied to the internal combustion engine can be always controlled accurately on the basis of the computed blending ratio compensation coefficient.

9 Claims, 7 Drawing Sheets

O₂ SENSOR OUTPUT $V_O$

INTEGRAL COMPENSATING TERM $K_I$

FEEDBACK LEARNED VALUE $K_{LRN}$

BLENDING RATIO MEASUREMENT TIMER $T_B$

BLENDING RATIO COMPENSATION COEFFICIENT $K_B$

BLENDING RATIO
MEASUREMENT
TIMER
$T_B$

BLENDING RATIO
COMPENSATION
COEFFICIENT $K_B$     1.0

5,197,451

METHOD FOR DETECTING FUEL BLENDING RATIO

TECHNICAL FIELD

This invention relates to a fuel blending ratio detecting method for detecting the blending ratio of a mixed fuel supplied to an internal combustion engine without the use of a blending ratio sensor.

BACKGROUND ART

Methanol is now noted as fuel giving rise to less environmental pollution, and methanol engines are also being developed now. However, immediate change-over of fuel used in all kinds of automotive vehicles from gasoline to methanol is almost impossible, and, at the time of change-over, a situation will occur where at least temporarily both the methanol fuel and the gasoline fuel are used.

With a view to deal with such a situation, introduction of a vehicle is proposed in which both the gasoline fuel and the methanol fuel can be used, that is, the vehicle has a degree of freedom with respect to fuel to be used. (Such a vehicle will be referred to hereinafter simply as an FFV.)

In order that the engine of such an FFV can be accurately controlled, the blending ratio which is the mixing ratio of fuel between the gasoline and the methanol is to be continuously detected so as to execute various required controls on the engine. A blending ratio detector or a sensor for use in such a purpose has been developed and is now in use which can be directly associated with the fuel supply system of the engine so as to directly detect the blending ratio of the fuel.

However, the practical use of the blending ratio sensor using a conventional photoelectric transducer is delayed due to the difficulty of temperature compensation that is frequently required and due to frequent error and durability problems attributable to dirt progressively accumulating on the optical system.

SUMMARY OF THE INVENTION

It is an object of the present invention to provide a fuel blending ratio detecting method capable of detecting the blending ratio by the output of an $O_2$ sensor.

To attain the above object, the present invention provides a fuel blending ratio detecting method for an internal combustion engine having a fuel feed system feeding a mixed fuel of gasoline and methanol to the internal combustion engine, an $O_2$ sensor generating information of an air/fuel ratio in exhaust gases from the internal combustion engine, the sensor output being increased or decreased with time relative to a rich/lean decision voltage, a memory for storing an initial blending ratio compensation coefficient as a current blending ratio compensation coefficient, and control means computing an air/fuel ratio feedback compensation coefficient by a method including at least an integral control of the output of said $O_2$ sensor thereby regulating the quantity of supplied fuel so that an air/fuel ratio of the fuel supplied to the internal combustion engine corresponds to a target value, comprising the steps of:

computing a feedback learned value on the basis of said feedback compensation coefficient at intervals of a predetermined period;

reading out the current blending ratio compensation coefficient from the memory;

multiplying the current blending ratio compensation coefficient by said feedback learned value to compute the next blending ratio compensation coefficient; and storing the next blending ratio compensation coefficient in the memory as the current blending ratio compensation coefficient.

According to this method, the blending ratio can be obtained by computing the feedback compensation coefficient on the basis of the air/fuel ratio information, computing the feedback learned value on the basis of the feedback compensation coefficient, and updating the blending ratio compensation coefficient on the basis of this feedback learned value.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS OF THE INVENTION

A fuel blending ratio detecting method according to an embodiment of the present invention will now be described.

Figure 1:
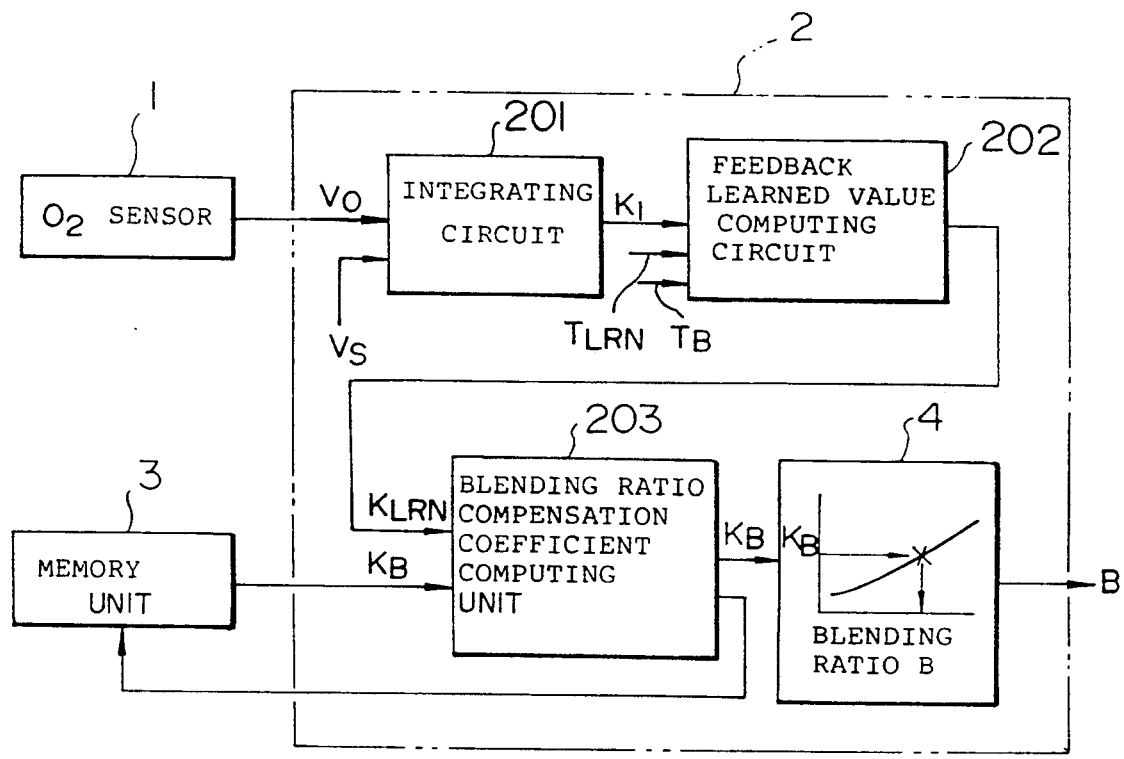
FIG. 1 is a block diagram illustrating the method for an embodiment of the present invention.

As shown in FIG. 1, this method uses an $O_2$ sensor 1 capable of generating air/fuel ratio information, that is, oxygen concentration information in exhaust gases of an internal combustion engine, a controller 2 for generating a blending ratio B used for the control on the basis of the output $V_0$ of the sensor, a memory 3 for storing a blending ratio compensation coefficient $K_B$ computed according to the blending ratio of the mixed fuel of gasoline and methanol actually supplied, and a blending ratio map 4 used for mapping the blending ratio compensation coefficient $K_B$ corresponding to the blending ratios B.

Figure 2A:
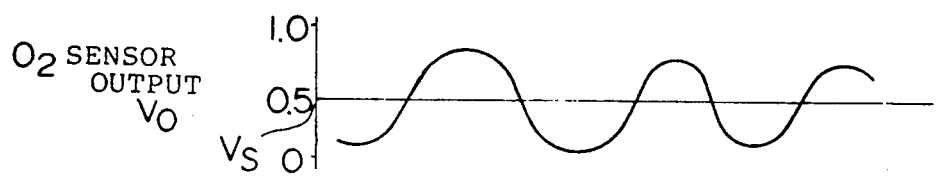
FIGS. 2a to 2e are waveform diagrams showing how an air/fuel ratio output and other characteristic values change with time according to the method for an embodiment of the present invention.

The $O_2$ sensor referred to herein generates the output $V_O$ responsive to the air/fuel ratio and increases or decreases with time relative to a rich/lean decision voltage $V_S$ (the value where the concentration of oxygen in exhaust gases is regarded to be stoichiometric). (Refer to FIG. 2a.)

Figure 2B:
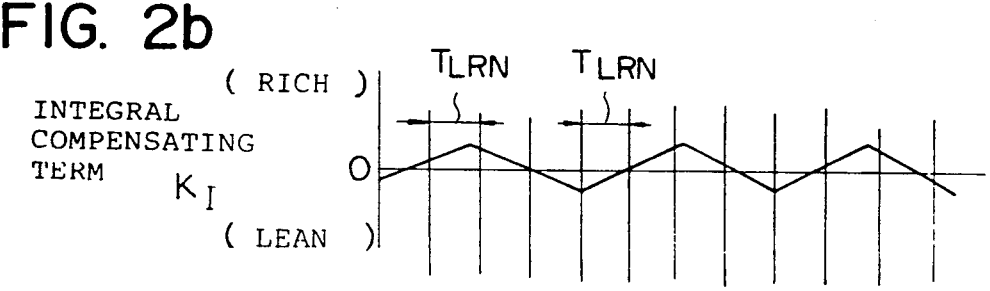

In the method of the present embodiment, firstly, the air/fuel ratio responsive sensor output $V_O$ of the $O_2$ sensor is compared with the decision voltage $V_S$ in an integrating circuit 201 in the controller 2. Depending on the magnitude of the former relative to the latter, its proportional gain and its integral gain are proportionated and integrated to compute a feedback compensation coefficient $K_{FB}$ so as to provide an integral compensating term $K_I$ which is a factor of the compensation coefficient $K_{FB}$. (Refer to FIG. 2b.)

Figure 2C:
Figure 2D:
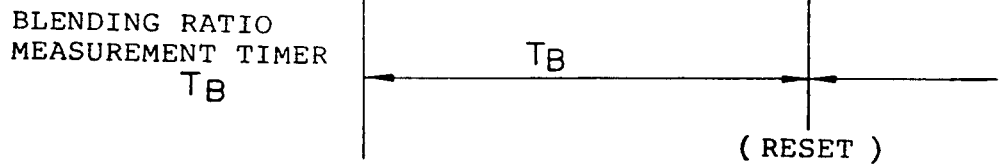
Figure 2E:

Whether the integrated value of the integral compensating term $K_I$ is positive or negative is decided in each of predetermined learning periods $T_{LRN}$ in a feedback learned value computing circuit 202, and, as a result, a feedback learned value $K_{LRN}$ is computed. That is, the feedback learned value $K_{LRN}$ referred to herein is such that, depending on whether the integral compensating term $K_I$ for the air/fuel ratio feedback compensation coefficient $K_{FB}$ described above is positive or negative, a predetermined value $\Delta K_{LRN}$ is added to or subtracted from the preceding value $K_{LRN}$. (Refer to FIG. 2c.) The feedback learned value $K_{LRN}$ updated every predetermined learning period $T_{LRN}$ is supplied to a blending ratio compensation coefficient computing unit 203 at the end of a fixed blending ratio measuring period $T_B$. (Refer to FIG. 2d.)

The blending ratio compensation coefficient computing unit 203 reads out the preceding blending ratio compensation coefficient $K_B$ from the memory 3 and multiplies that value by the feedback learned value $K_{LRN}$ to newly compute the blending ratio compensation coefficient $K_B$ which is used to update the corresponding value stored already in the memory 3.

Then, the controller 2 back-reads the blending ratio map 4 to convert the updated blending ratio compensation coefficient $K_B$ into the blending ratio B.

The control blending ratio B thus obtained (or the blending ratio compensation coefficient $K_B$ which includes this blending ratio information) is used in, for example, the ignition timing control for the engine and the computation of the basic driving time $T_B$ ($=A/N(n) \times K_B \times k$) for the fuel injection valves in the engine fuel feed system per quantity of intake air $A/N(n)$. The symbol k is another compensation coefficient.

Now, an engine control system for the FFV. to which the fuel blending ratio detecting method of the present embodiment is applied will be described by reference to FIG. 3.

Figure 3:
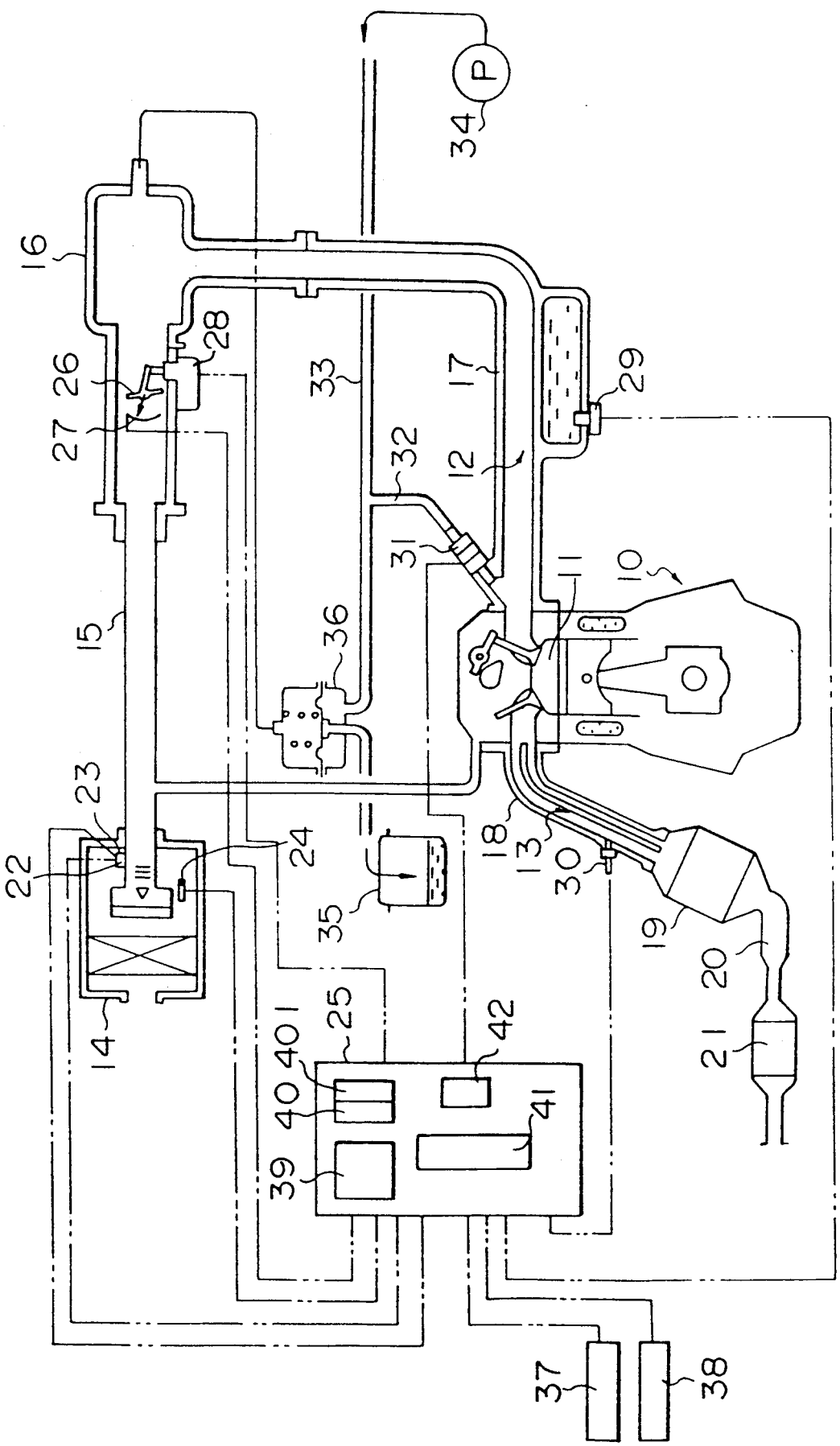
FIG. 3 schematically shows the structure of an engine control system to which the method for an embodiment of the present invention is applied.

Referring to FIG. 3, combustion chambers 11 of an engine 10 communicate with an intake passage 12 and an exhaust passage 13 at a suitable time. The intake passage 12 is formed of an air cleaner 14, a first intake pipe 15, an expansion pipe 16 and a second intake pipe 17. The exhaust passage 13 is formed of a first exhaust pipe 18, a catalyst 19, a second exhaust pipe 20 and a muffler 21.

An air flow sensor 22 generating information regarding the quantity of flow of air, an atmospheric pressure sensor 23 generating information regarding the atmospheric pressure, and an atmospheric temperature sensor 24 generating information regarding the air temperature are disposed in the air cleaner 14, and they are connected to an engine control unit (referred to hereinafter merely as a controller) 25.

A throttle valve 26 is mounted in the expansion pipe 16, and a throttle position sensor 27 is associated with the throttle valve 26. The idle position of this throttle valve 26 is controlled by the controller 25 through an idle speed control motor (an ISC motor) 28.

A water jacket is associated with part of the second intake pipe 17, and a water temperature sensor 29 is mounted on the water jacket.

Midway of the first exhaust pipe 18, an $O_2$ sensor 30 is mounted so as to generate information regarding the air/fuel ratio in the exhaust gases from the engine.

Fuel injection valves 31 are mounted at the end of the intake passage 12. Each fuel injection valve 31 is connected to a fuel pipe 33 through a branch pipe 32. This fuel pipe 33 connects between a fuel pump 34 and a fuel tank 35, and, midway of this fuel pipe 33, a fuel pressure regulator 36 for regulating the fuel pressure is mounted. The regulator 36 is constructed so as to regulate the fuel pressure by increasing or decreasing the fuel pressure according to the boost pressure.

In FIG. 3, the numeral 37 designates a crank angle sensor generating information regarding the crank angle, and the numeral 38 designates a top dead center sensor generating information regarding the top dead center of the first cylinder.

The controller 25 includes a control circuit 39, a memory circuit 40, an input/output circuit 41, and a valve driver circuit 42.

The control circuit 39 receives input signals from the individual sensors, and, after processing these input signals according to the control program shown in FIG. 5, generates control signals through the valve driver circuit 42.

Figure 5A:
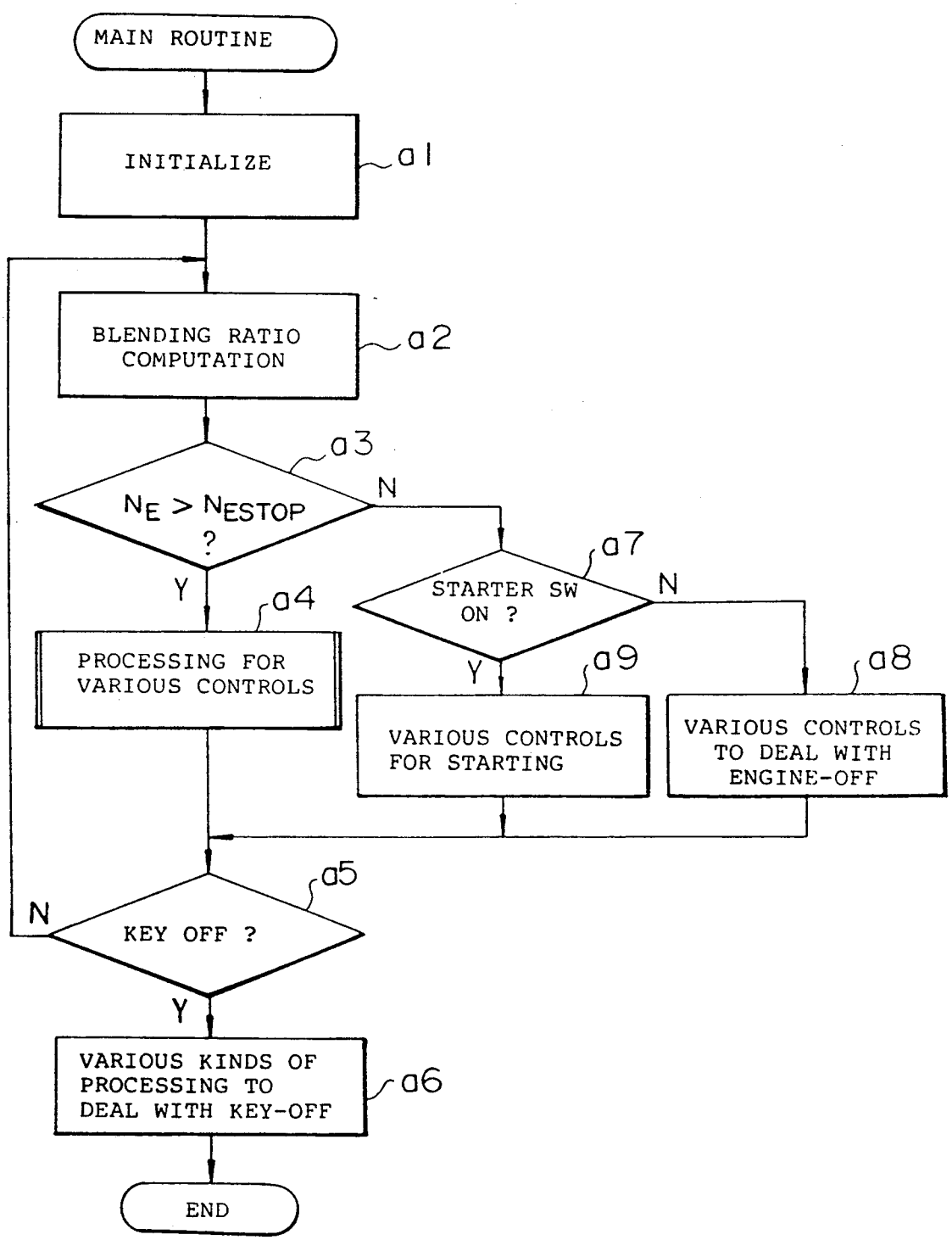
FIGS. 5a and 5b are flow charts of a control program executed by the system shown in FIG. 3 for the engine control purpose.
Figure 5B:
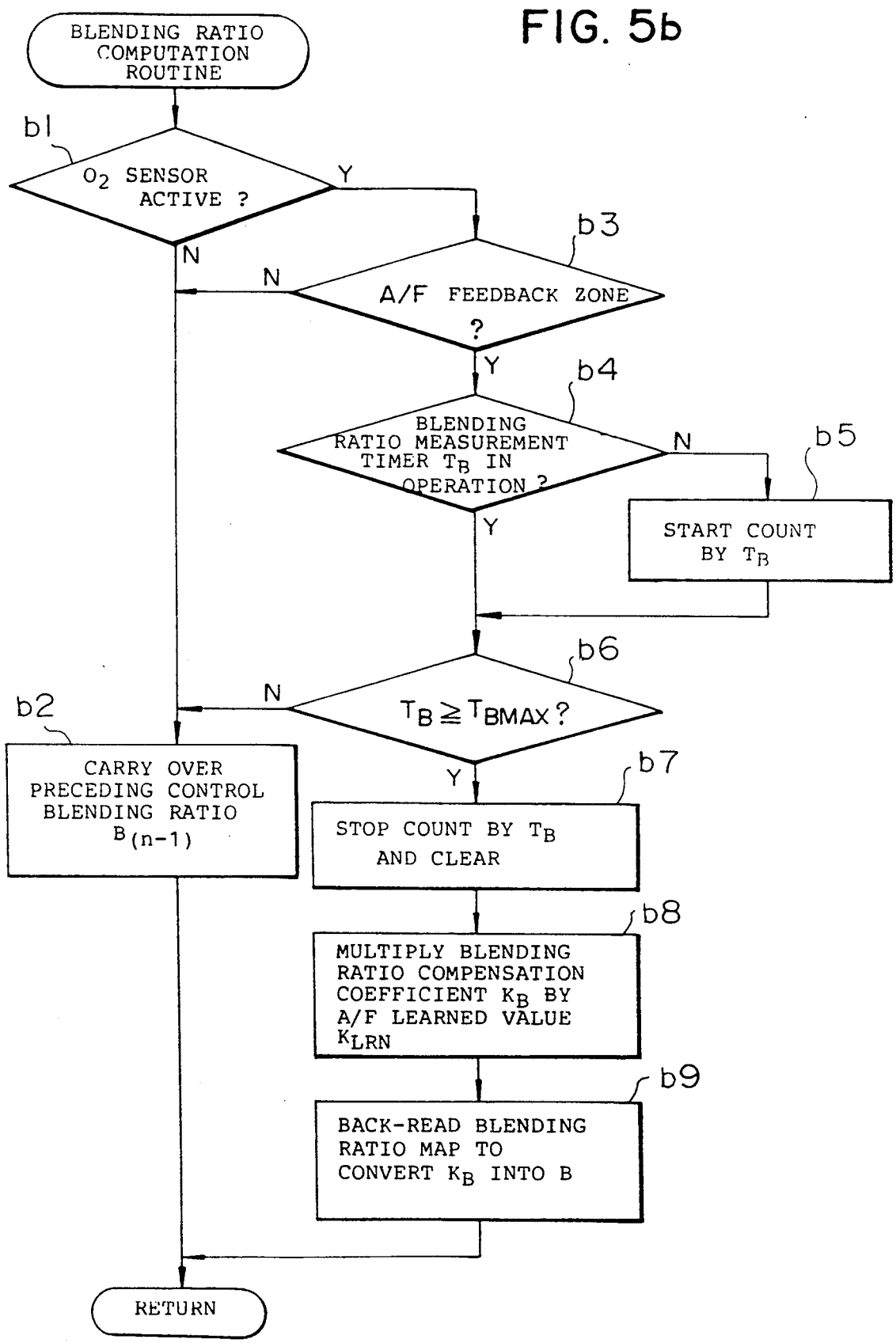

The memory circuit 40 stores the control program including a main routine and a blending ratio computation shown in FIGS. 5a and 5b, together with a blending ratio map 4 similar to that shown in FIG. 1. Further, the memory circuit 40 includes an area for storing the blending ratio compensation coefficients $K_B$, the control blending ratio B, etc. which are used during the control.

The input/output circuit 41 acts to suitably receive the output signals of the individual sensors described above to generate various control signals through driver circuits (not shown) or generate a valve drive signal through the valve driver circuit 42 so as to open each of the fuel injection valves 31 at the predetermined timing.

The operation of the controller 25 will now be described together with the control program shown in FIGS. 5a and 5b.

When an engine key switch (not shown) is turned on, the controller 25 and the individual sensors start to operate. First, in a step a1 of a main routine shown in FIG. 5a, the controller 25 initializes various settings, measured values, etc. and, in a step a2, executes a blending ratio computation routine.

In this blending ratio computation routine shown in FIG. 5b, firstly, whether or not the $O_2$ sensor 30 is active is decided in a step b1 according to the following conditions: 1. The $O_2$ sensor is decided to be inactive when the engine is stopped. 2. The sensor is decided to be active when the sensor output crosses a predetermined level (for example, 0.6 V) when 15 seconds has elapsed after the engine is stalled and started. 3. The sensor is decided to be inactive when the state where the sensor output does not cross a predetermined level (for example, 0.6 V) continues over a predetermined period (for example, 20 seconds) during the feedback control.

When the $O_2$ sensor 30 is not decided to be active, the step b1 is followed by a step b2 in which the preceding blending ratio B(n−1) is used, and then the program returns.

On the other hand, when the sensor is decided to be active, the step b1 is followed by a step b3 which decides whether or not the engine is in an air/fuel ratio feedback zone. The conditions for deciding that the engine is in the air/fuel ratio feedback zone are, for example, as follows: 1. The temperature of water is higher than 75° C. 2. The temperature of intake air is higher than 50° C. 3. The atmospheric pressure ranges from 580 to 800 mmHg. 4. The engine is neither in its accelerating range nor in its decelerating range. 5. The engine is not operating in a very low speed range. 6. There is no change in the operating zone of the engine.

When the engine is decided not to be in the air/fuel feedback zone, the step b3 is followed by the step b2, while the engine is decided to be in that zone, the step b3 is followed by a step b4.

In the step b4, whether a blending ratio measurement timer $T_B$ is operating or not is decided. When the blending ratio measurement timer $T_B$ is decided not to be operating, the timer is started in a step b5. In a step b6, counting of a time $T_{BMAX}$ by the blending ratio measurement timer $T_B$ is detected. Before the above time is counted, the step b6 is followed by the step b2, while after the above time is counted, the step b6 is followed by a step b7.

In the step b7, the blending ratio measurement timer $T_B$ is stopped and cleared. Then, in a step b8, the blending ratio compensation coefficient $K_B$ is read out from the predetermined area, and the feedback learned value $K_{LRN}$ learned during the blending ratio measurement period $T_B$ is multiplied by the blending ratio compensation coefficient $K_B$ to update the value of $K_B$ ($K_B \leftarrow K_B \times K_{LRN}$).

Figure 4A:
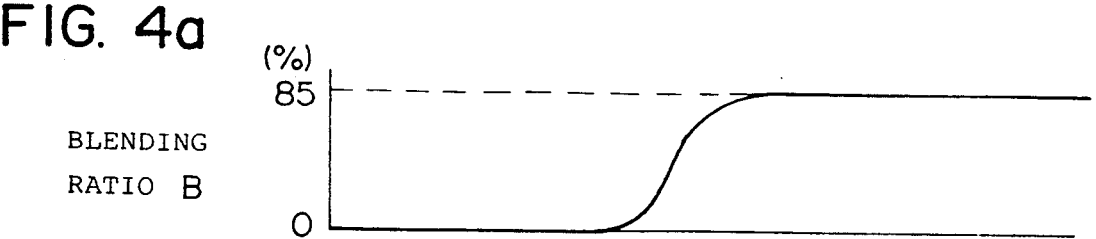
FIGS. 4a to 4g are waveform diagrams showing how the characteristic values in the engine control system shown in FIG. 3 change with time.

It is supposed now that the blending ratio B of the fuel is changed from 100% of gasoline to 85% of methanol. (Refer to FIG. 4a).

Figure 4B:
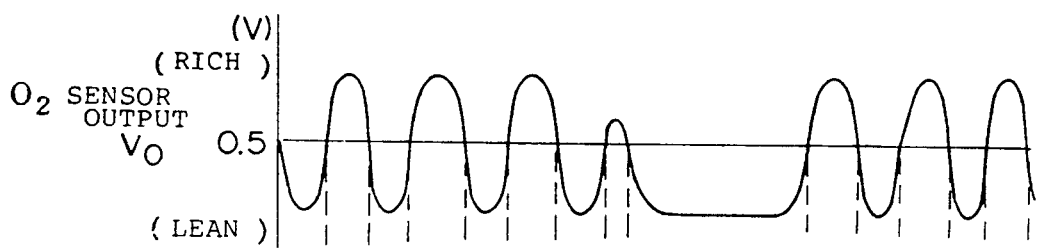
Figure 4C:
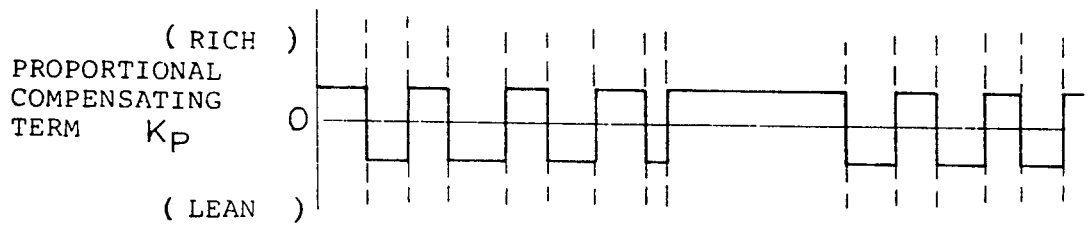
Figure 4D:
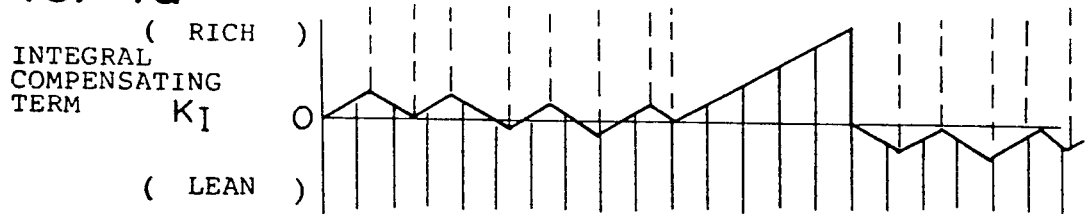

In this case, because the stoichiometric air/fuel ratio of the methanol is lower than that of the gasoline (shortage of fuel), the sensor output $V_O$ continues to fluctuate on the lean side. (Refer to FIG. 4b.) Then, due to the magnitude relation between the sensor output $V_O$ and the decision voltage $V_S$, the integral compensating term $K_I$ of the feedback compensation coefficient $K_{FB}$ ($=1.0+K_1+K_2$) obtained by proportionating and integrating the proportional gain and the integral gain continues to increase or decrease on the rich side. (Refer to FIGS. 4c and 4d.)

Figure 4E:
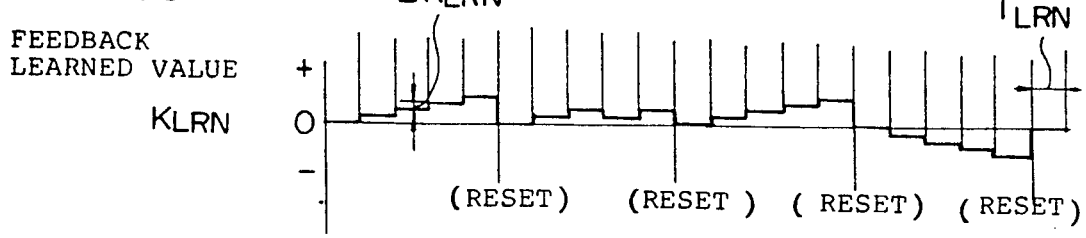
Figure 4F:
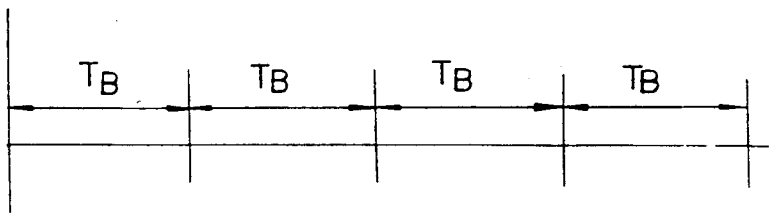
Figure 4G:
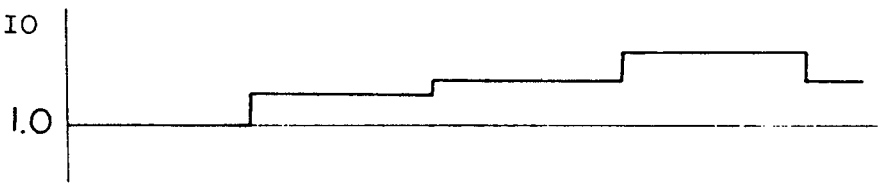

The feedback learned value $K_{LRN}$ starts from zero each time the predetermined blending ratio measurement period $T_B$ starts. Depending on whether the integral compensating term $K_I$ of the air/fuel ratio feedback compensation coefficient $K_{FB}$ is decided to be positive or negative in each predetermined learning cycle $T_{LRN}$ (of, for example, 25 milliseconds), the predetermined value $\Delta K_{LRN}$ is added to or subtracted from the feedback learned value $K_{LRN}$ obtained immediately before. (Refer to FIGS. 4e and 4f.) Further, the feedback learned value $K_{LRN}$ updated in each predetermined learning cycle $T_{LRN}$ is added to or subtracted from the preceding blending ratio compensation coefficient $K_B$ at the time of counting $T_{BMAX}$ of the blending ratio measurement period $T_B$. Thus, the blending ratio compensation coefficient $K_B$ is updated at the end of each predetermined blending ratio measurement period $T_B$. (Refer to FIG. 4g.)

Then, in a step b9, the controller 25 back-reads the blending ratio map 4 (shown in FIG. 1) in a direction as shown by the arrow in FIG. 1, and the control blending ratio B is computed on the basis of the updated blending ratio compensation coefficient $K_B$. The program then returns.

After the blending ratio computation routine is executed, the program returns to a step a3 of the main routine shown in FIG. 5a. In this step a3, the engine rotation speed $N_E$ is detected, and decision is made as to whether or not the detected engine rotation speed is higher than an engine operation decision speed $N_{ESTOP}$.

When a step a4 is reached during the rotation of the engine, the control blending ratio B and the blending ratio compensation coefficient $K_B$ are suitably read out so as to carry out various kinds of processing including processing for controlling the quantity of fuel injection and processing for controlling the ignition timing.

The various kinds of processing carried out in the step a4 includes how, how to compute the fuel injection valve driving time $T_{inj}$, which will be described as an example. First, the basic driving time $T_B$ [$=A/N(n) \times K_B \times k$] per unit intake air quantity is computed. This blending ratio compensation coefficient $K_B$ is used so that the basic driving time $T_B$ (the basic fuel quantity) per predetermined intake air quantity $A/N(n)$ can be regulated to the value corresponding to the blending ratio of the supplied fuel. Then, the fuel injection valve driving time $T_{inj}$ is computed using the basic driving time $T_B$ and compensated values of the feedback compensation coefficient $K_{FB}$, atmospheric air temperature compensation coefficient Kt, atmospheric pressure compensation coefficient Kb, water temperature compensation coefficient Kwt, and acceleration compensation coefficient Kac. ($T_{inj} = T_B \times K_{FB} \times Kt \times Kb \times Kwt \times Kac$)

When a step a5 is reached after the various kinds of processing are carried out, a decision is made as to whether or not the key is off. When the key is not off, the step a5 is followed by the step a2, while the key is off, the step a5 is followed by a step a6 in which various kinds of processing at the key-off such as, for example, processing for storing data in a non-volatile memory are carried out to complete the main routine.

When the engine is stopped, the step a3 is followed by a step a7 in which it is checked whether or not the starter switch is on is checked. When the starter switch is off, the step a7 is followed by a step a8. In this step a8, predetermined steps of processing corresponding to the engine stoppage are carried out. On the other hand, when the starter switch is on, the step a7 is followed by a step a9. In this step a9, various kinds of processing necessary for starting the vehicle are carried out, and the step a9 is followed by the step a5.

It will be understood from the foregoing description that, in the method of the present invention, a blending ratio is obtained by computing a feedback learned value on the basis of a feedback compensation coefficient computed on the basis of an air/fuel ratio indicative output of an O$_2$ sensor, updating a blending ratio compensation coefficient on the basis of the feedback learned value, and computing on the basis of the updated blending ratio compensation coefficient.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A fuel blending ratio detecting method for an internal combustion engine having a fuel feed system feeding a mixed fuel of gasoline and methanol to the internal combustion engine, an O$_2$ sensor generating information of an air/fuel ratio in exhaust gases from the internal combustion engine, the $O_2$ sensor output being increased or decreased with time relative to a rich/lean decision voltage, a memory for storing an initial blending ratio compensation coefficient as a current blending ratio compensation coefficient, and control means computing an air/fuel ratio feedback compensation coefficient by a method including at least an integral control of the output of said $O_2$ sensor thereby regulating the quantity of supplied fuel so that an air/fuel ratio of the fuel supplied to the internal combustion engine corresponds to a target value, comprising the steps of:
- computing a feedback learned value on the basis of said air/fuel ratio feedback compensation coefficient at intervals of a predetermined period;
- reading out the current blending ratio compensation coefficient from the memory;
- multiplying the current blending ratio compensation coefficient by said feedback learned value to compute the next blending ratio compensation coefficient; and
- storing the next blending ratio compensation coefficient in the memory as the current blending ratio compensation coefficient.

2. A method according to claim 1, further comprising the step of converting the current blending ratio compensation coefficient into a blending ratio of methanol in the fuel supplied to the internal combustion engine by a map.

3. A method according to claim 2, further comprising the step of computing the blending ratio of the fuel on the basis of said next blending ratio compensation coefficient by said map at intervals of a predetermined period, said blending ratio being used as a control blending ratio for controlling the internal combustion engine.

4. A method according to claim 1, wherein said control means comprises proportional and integral controls.

5. A control method of an internal combustion engine having a fuel feed system feeding a mixed fuel of gasoline and methanol to the internal combustion engine, an $O_2$ sensor generating information of an air/fuel ratio in exhaust gases from the internal combustion engine, the $O_2$ sensor output being increased or deceased with time relative to a rich/lean decision voltage, a memory for storing an initial blending ratio compensation coefficient as a current blending ratio compensation coefficient, and control means computing an air/fuel ratio feedback compensation coefficient by a method including at least an integral control of the output of said $O_2$ sensor thereby regulating the quantity of supplied fuel so that an air/fuel ratio of the fuel supplied to the internal combustion engine corresponds to a target value, comprising the steps of:
- computing a feedback learned value on the basis of said air/fuel ratio feedback compensation coefficient at intervals of a predetermined period;
- reading out the current blending ratio compensation coefficient from the memory;
- multiplying the current blending ratio compensation coefficient by said feedback learned value to compute the next blending ratio compensation coefficient;
- controlling the quantity of fuel supplied to the internal combustion engine on the basis of the next blending ratio compensation coefficient; and
- storing the next blending ratio compensation coefficient in the memory as the current blending ratio compensation coefficient.

6. A fuel blending ratio detecting system for an internal combustion engine comprising:
- fuel feed means for feeding a mixed fuel of gasoline and methanol to the internal combustion engine;
- an $O_2$ sensor for generating information of an air/fuel ratio in exhaust gases from the internal combustion engine, the output of said $O_2$ sensor being increased or decreased with time relative to a rich/lean decision voltage;
- a memory for storing an initial blending ratio compensation as a current blending ratio compensation coefficient and storing updated values of said current blending ratio compensation coefficient; and
- control means for computing an air/fuel ratio feedback compensation coefficient including,
  - integrating means for integrally controlling the output of said $O_2$ sensor to regulate the quantity of supplied fuel so that an air/fuel ratio of the fuel supplied to the internal combustion engine corresponds to a target value,
  - feedback learned value computing means for computing a feedback learned value on the basis of said air/fuel ratio feedback compensation coefficient at intervals of a predetermined period, and
  - blending ratio compensation coefficient computing means for reading out the current blending ratio compensation coefficient from the memory, multiplying the current blending ratio compensation coefficient by said feedback learned value to compute the next blending ratio compensation coefficient and storing the next blending ratio compensation coefficient in the memory as the current blending ratio compensation coefficient.

7. A fuel blending ratio detecting system according to claim 6, wherein said blending ratio compensation coefficient means converts the current blending ratio compensation coefficient into a blending ratio of methanol in the fuel supplied to the internal combustion engine by a map.

8. A fuel blending ratio detecting system according to claim 7, wherein said blending ratio compensation coefficient means computes the blending ratio of the fuel on the basis of the next blending ratio compensation coefficient by said map at intervals of a predetermined period, said blending ratio being used as a control blending ratio for controlling the internal combustion engine.

9. A fuel blending ratio detecting system according to claim 6, wherein said control means comprises proportional and integral controls.

* * * * *